United States Patent [19]

Schnorf

[11] Patent Number: 5,367,341
[45] Date of Patent: Nov. 22, 1994

[54] DIGITAL VIDEO EDITOR HAVING LOST VIDEO FRAME PROTECTION

[75] Inventor: Peter Schnorf, Palo Alto, Calif.

[73] Assignee: Canon Information Systems, Inc., Costa Mesa, Calif.

[21] Appl. No.: 963,737

[22] Filed: Oct. 20, 1992

[51] Int. Cl.$^5$ .......................................... H04N 5/907
[52] U.S. Cl. .................................. 348/616; 358/311; 360/14.2; 360/14.3
[58] Field of Search .................... 360/14.1, 14.2, 14.3; 358/311; 348/616; H04V 5/907

[56] References Cited

U.S. PATENT DOCUMENTS

| | | | |
|---|---|---|---|
| 4,574,319 | 3/1986 | Konishi | 360/14.3 X |
| 4,587,572 | 5/1986 | DiGiulio | 360/14.3 |
| 4,698,664 | 10/1987 | Nichols et al. | 360/14.3 X |
| 4,835,626 | 5/1989 | Wilkinson et al. | 360/14.3 |
| 4,935,823 | 6/1990 | Pelloni et al. | 360/14.3 X |
| 5,018,027 | 5/1991 | Roggendorf | 360/14.2 |
| 5,223,485 | 8/1993 | Yang | 360/14.2 X |
| 5,257,104 | 10/1993 | Asai | 360/14.3 X |

OTHER PUBLICATIONS

Digital Film Product Specifications, Digital Film Studio: DV2000 (1992).
Diva Video Shop, "The Complete Solution for Editing QuickTime Movies" (1991).
Murie, Michael D., "QuickTime Movie Editing Gets Reel: Adobe Premiere Takes a Bow", *Newmedia*, 34–35 (Mar. 1992).
Sony Product Brochure, "Hi8 Videocassette Recorder/Palyer".
American National Standards Institute/Society of Motion Picture Picture Television Engineers, "American national Standard for television-time and control code-video and audio tape for 525-line/60-field systems", pp. 1, 6.

*Primary Examiner*—Mark R. Powell
*Attorney, Agent, or Firm*—Fitzpatrick, Cella, Harper & Scinto

[57] ABSTRACT

A digital video editing apparatus in which the frame number information that is encoded in non-visible portions of frames in an analog video signal is utilized to ensure that there are no missing frames of corresponding digital video information. The frames of analog video information are digitized and stored in the editing apparatus using a two-pass procedure. In the first pass, as many analog video frames as possible are digitized and stored, and the frame numbers from the frames are utilized to form a list of missing frames. In the second pass, the missing frame list is utilized to reposition the analog video source and to read in the missing frames. If desired, a digital frame trap may be provided such that the contents of a temporary frame memory are frozen until computer processing apparatus has enough time permanently to store the trapped frame. Once a complete set of digital frames has been converted and stored, digital video editing may be undertaken, and the edited digital frames may be outputted in analog form.

49 Claims, 6 Drawing Sheets

DIGITAL VIDEO EDITOR HAVING LOST VIDEO FRAME PROTECTION

BACKGROUND OF THE INVENTION

1. Field Of The Invention

The present invention concerns a digital video editor which converts frames of analog video information into corresponding frames of digital video information in real time and which detects and fills in lost frames of video information by re-reading the original analog information in additional passes or by reconstructing them from adjacent frames.

2. Description Of The Related Art

With recent advances in speed and storage capacity of personal computing systems, it has become possible to convert analog video information in real time into corresponding digital video information, to edit the information while in digital form, and to convert the edited digital information back into an analog form.

Such an arrangement is desirable for several reasons. First, it eliminates the need for customized analog video editing machinery and instead allows a general purpose programmable computer to perform editing. The editing program on such a computer may be changed at will thereby permitting flexibility and facilitating change when new advances in editing technology are made.

Second, digital editing offers a simpler interaction interface and permits relatively unskilled workers to produce sophisticated results. As skill grows, a more complete set of editing effects may be generated through use of computer graphics, digital image processing and text editing techniques.

Finally, as the cost of personal computing machinery decreases, it becomes possible for more and more people to use video editing capabilities. Those capabilities would be foreclosed to an ordinary individual who could not afford high-end and single use items such as analog editing machinery.

However, acquiring digital video information that is full frame size, full color, and full motion places unprecedented demands on the bandwidth of digital computing machinery, and these demands can cause entire frames of video information to be lost. For example, corresponding to the NTSC standard, a full frame is $640 \times 480$ pixels, and full motion is 30 frames per second. With full color of 24 bits per pixel, the bandwidth requirements to handle such a digital video signal in real time is $640 \times 480 \times 30 \times 24 = 221,184,000$ bits per second which far exceeds the capabilities of currently available personal computing machinery. Future standards such as HDTV (high definition television) are even more demanding. Compression techniques such as JPEG ("joint photographic expert group"), MPEG ("motion picture expert group") and CCITT H.261 ("International Telegraph and Telephone Consultative Committee") have been proposed to reduce the bandwidth requirements to acceptable levels, but other factors can still cause video frames to be lost.

For example, known compression techniques are not "loss-less". That is, known compression techniques introduce errors when the compressed data are uncompressed. If the final video is to be of the same quality as the original video, compression cannot be so great as to introduce errors that are perceived as visual degradation in image quality. This limits the amount of bandwidth reduction obtainable from compression, and a fine balance must be struck between bandwidth reduction from compression and the bandwidth capabilities of the digital computing machinery. Today's high-end PCs and workstations have barely the bandwidth capabilities required to handle NTSC-type data, and HDTV processing put those capabilities into jeopardy.

Another factor contributing to the loss of video frames is multitasking. Current operating systems on workstations as well as next generation operating systems on personal computing equipment have multitasking capabilities which permit several tasks to run concurrently. Those several tasks compete in real-time for shared resources of the computing equipment, such as an internal computing bus, the CPU and the hard disk. Multitasking, however, places further bandwidth demands on the digital equipment, as well as raises the possibility that the CPU is busy servicing one task when a video frame is ready to be stored. If the CPU is not able to store the video frame before the next video frame becomes available, that video frame will be ignored and lost.

Lost frames of digital video information are not acceptable for many reasons. Lost frames can make it impossible to obtain high quality cuts, merges, compositions, special effects, etc. For example, when creating a slow motion special effect, missing frames cause large jumps and unevenness that are visually unacceptable. Further, errors caused by missing frames accumulate over longer clips. Even if only three frames are lost per minute, an entire second of material is lost in a ten minute sequence. Because sound is generally handled on a separate channel from video, such losses will quickly de-synchronize sound and video.

Further still, some compression techniques such as MPEG do not fully encode each video frame independently, but rather fully encode only some reference frames. Frames between the reference frames are encoded as the difference or change from the reference frames. If a reference frame is lost, it is impossible to re-create the original image for frames which depend on the lost reference frame.

To handle lost frames of digital video information in a real time digital video environment, a two-pass procedure has been proposed. In the first pass, the analog video equipment plays out the analog video signal, and the digital video equipment digitizes and stores as many frames of video information as possible. While the analog video equipment is playing out the video signal, it generates frame number information which is transmitted to the digital equipment over a frame number interface that is distinct from the video interface. The digital video equipment inspects the frame number information to determine if any frames have been lost and to determine the identity of those frames. If any frames have been lost, then a second pass is performed in which the analog video equipment is repositioned using the frame number information from the frame number interface and the missing frames are played out. If frames are still missing after the second pass, then additional passes are performed until all frames have been acquired in digital form.

The foregoing procedure is not entirely satisfactory. First, because the frame number information is not part of the video signal, and is supplied on a frame number interface that is separate from the video interface, it is possible that the video information on the video interface is not synchronized with the frame number information on the frame number interface. This means that the frame on the video interface is different from the frame indicated by the frame number information. Accordingly, it is not always possible to ensure that missing frames are properly detected, or to ensure that properly detected missing frames are supplied with the needed video data.

Second, there is no guarantee that progress will be made in finding missing frames. More specifically, even in the case where it is known with certainty that a frame is missing, there is no guarantee that the particular frame in question can be captured and added to the collection of already-digitized video frames. In fact, the same problems that caused the frame to be missed in the first pass, such as multitasking demands on shared resources, may also exist on subsequent passes, making it difficult ever to capture the missing frame.

SUMMARY OF THE INVENTION

It is an object of the foregoing invention to address the foregoing difficulties.

In one aspect, frame number information is provided in the analog frame itself, for example, in hidden lines such as those that conventionally appear at the top or the bottom of frames of analog video signals (vertical blanking interval). Because the frame number is in the frame itself, it is not possible to lose synchronization between the frame number and its corresponding video frame. The frame number is extracted from the video signal, and the extracted frame number is used to identify missing frames and to reposition the analog video information so as to fill in missing frames.

In another aspect, circuitry is provided to trap on the frame number and to freeze a temporary frame memory when the desired video data is stored therein. While frozen, no new video frame information is stored in the memory, thereby permitting the desired frame to be accessed and stored onto disk without danger of losing the desired information. Accordingly, it is possible to guarantee that missing frames are supplied.

This brief summary has been provided so that the nature of the invention may be understood quickly. A more complete understanding of the invention can be obtained by reference to the following detailed description of the preferred embodiment thereof in connection with the drawings which together form a complete part of the specification.

DETAILED DESCRIPTION OF THE PREFERRED EMBODIMENTS

Figure 1:
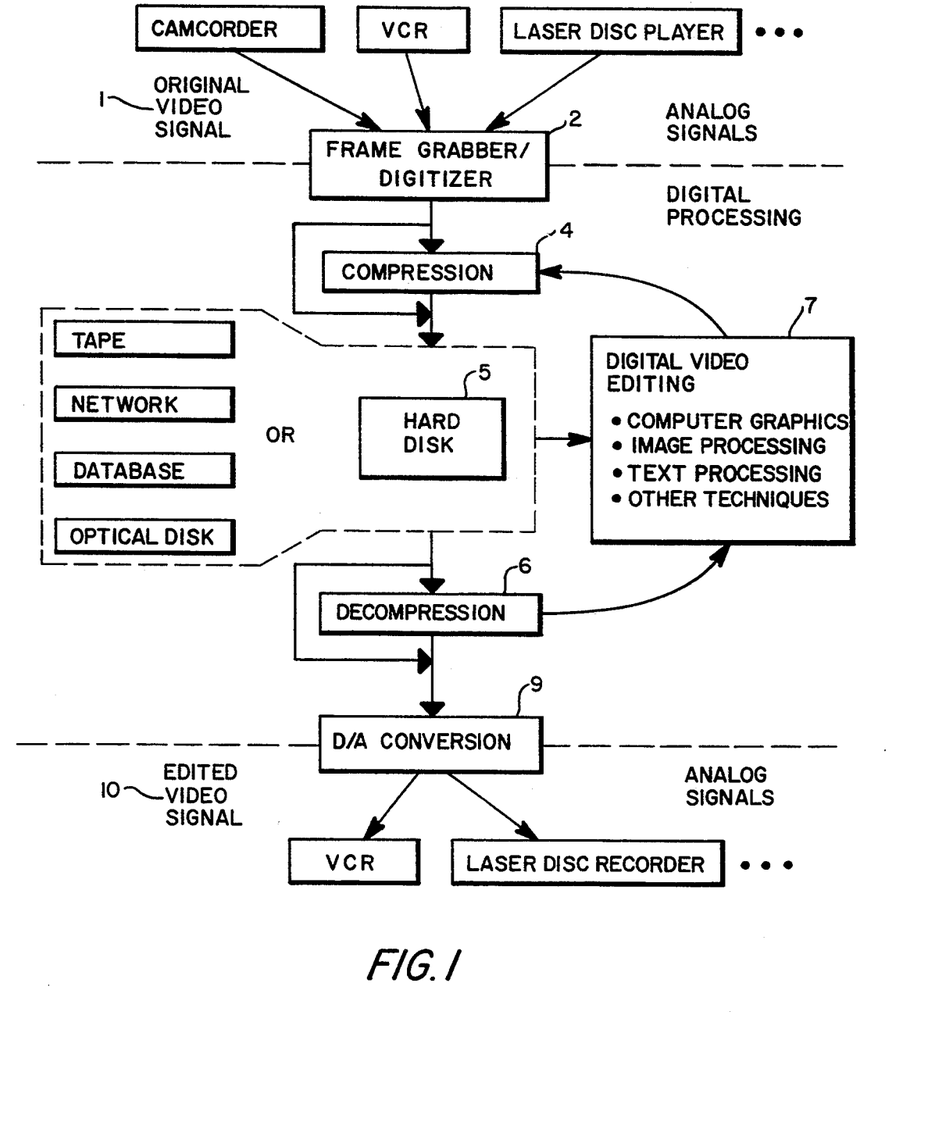
FIG. 1 is a functional block diagram showing functions of a digital video editing system according to the invention.

FIG. 1 is a functional block diagram showing a digital video editing apparatus according to the invention.

In FIG. 1, an original video signal 1 is provided by conventional means such as a camcorder, a VCR or a laser disc player to a frame grabber/digitizer 2. In real time, the frame grabber/digitizer captures analog frames of video information, and converts the analog information into full color digital information. The digital information is optionally compressed by compressor 4 prior to storage. Any compression technique, e.g., conventional JPEG, MPEG or H.261 techniques may be used. Preferably, compressor 4 is realized in hardware but software realizations are possible, too. The compressed or uncompressed digital video information is fed for storage on hard disk 5 or on any other secondary storage medium such as a tape drive a database system or an optical disk. The digital video information can also be sent over a network for remote processing or display.

The compressed digital video information is decompressed by decompressor 6 for digital video editing by processor 7. Depending on the compression method used, decompression is not necessary or can be done only partially for simple editing functions such as adding two frames together. Digital video editing may take the form of a variety of video editing techniques, such as the insertion of computer graphics; image processing such as color modification, aspect ratio modification, silhouetting, etc.; text processing; frame merging; or other techniques. The edited digital signal is returned to compressor 4 for optional recompression and for restorage.

Upon completion of desired video editing by processor 7, the edited video signal is fed from hard disk 5 (or the aforementioned secondary storage media) to decompressor 6 for conversion to an analog signal by D-to-A converter 9. D-to-A converter 9 feeds the edited analog video signal 10 for storage on any of a variety of analog media such as a VCR, a laser disc recorder, or the like.

Figure 2:
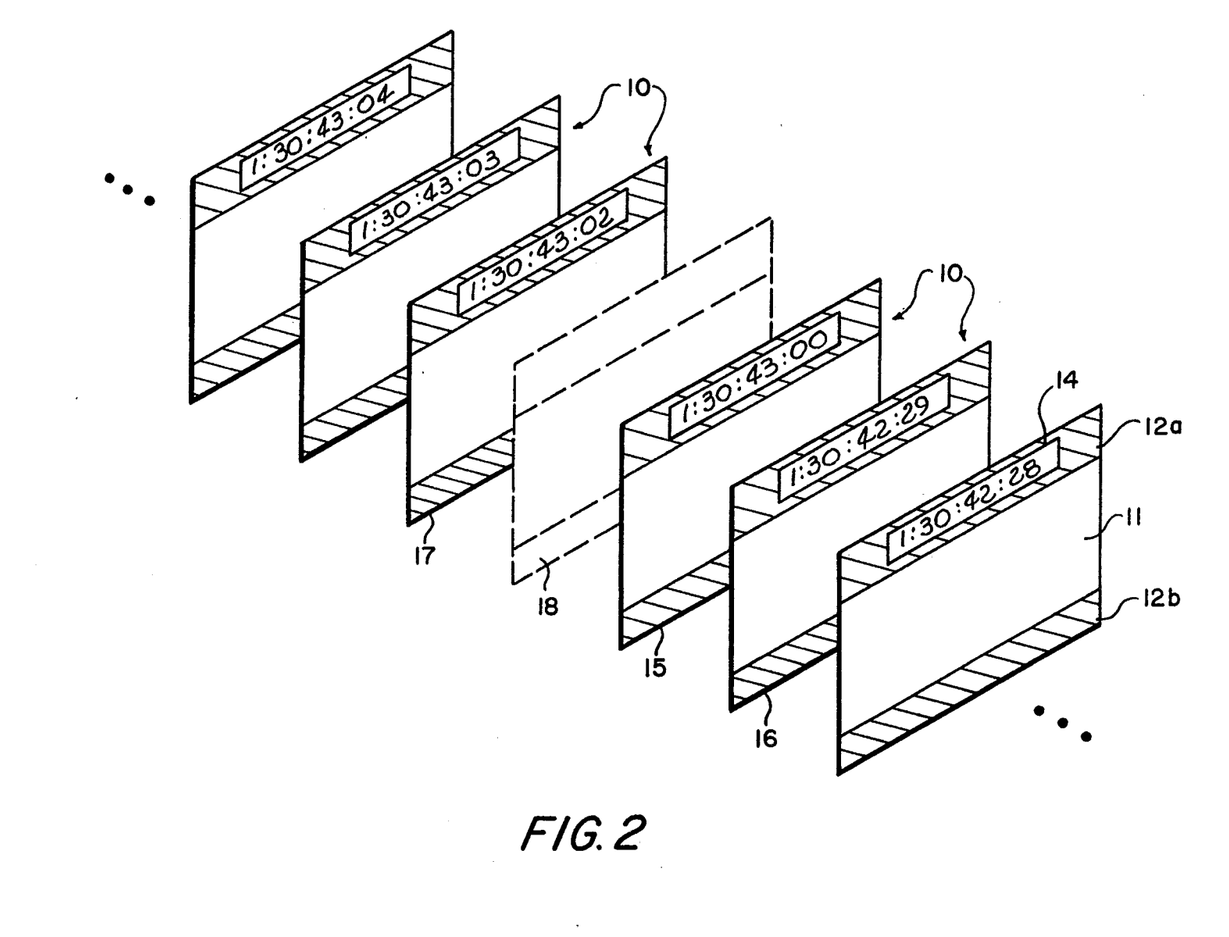
FIG. 2 is a representational view showing successive frames of video data.

FIG. 2 is a representational view of a sequence of video frames. As seen in FIG. 2, each of video frames 10 includes a visible video portion 11, as well as an non-visible video portion such as regions 12a and 12b at the top and bottom, respectively, of each frame. The non-visible video information includes frame number information such as that illustrated diagrammatically at 14. It is to be understood that the frame number information 14 is not ordinarily carried in human-readable form, but rather is encoded in machine readable form. Encoding techniques as defined by SMPTE/EBU are suitable, such as the vertical interval time code (VITC) which is encoded in the video signal itself typically between lines 10 and 20 of a frame.

In FIG. 2, the frame number information is depicted as if it were already decoded by a decoder, as will be described hereinafter. The frame number depicted here is in the form HH:MM:SS:FF where HH indicates the hour, MM indicates the minute, SS indicates the seconds and FF indicates the frame number (which ranges from 0 through 29), all measured from an arbitrary reference point such as the beginning of a video sequence. The precise method by which the frame number is carried is unimportant so long as the frame number is carried in the video frame itself, preferably in non-visible portions of the frame.

Figure 3:
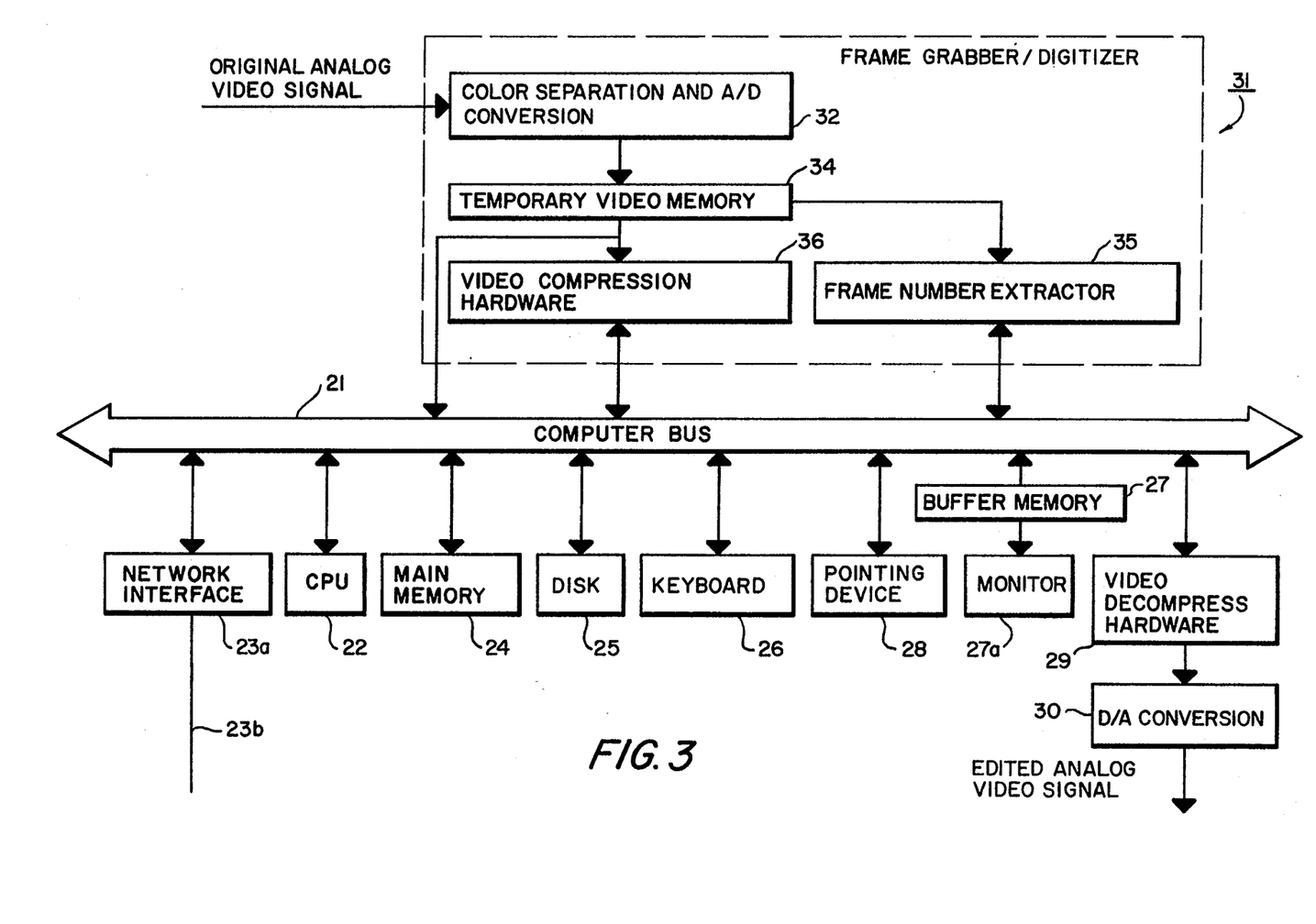
FIG. 3 is a block diagram of a first embodiment of the invention.

FIG. 3 is a detailed block diagram of a first embodiment of the invention which operates in accordance with the functional block diagram shown in FIG. 1. The embodiment shown in FIG. 3 includes many components which are found in a typical personal computing system, such as a computer bus 21 to which is connected a CPU 22 for executing programmable instruction steps by which digital video editing is performed. Also connected to computer bus 21 is a network interface 23a which permits the FIG. 3 digital video editor to operate in a local area network via network access 23b, a main memory 24 such as RAM in which program steps for execution by CPU 22 as well as program data are stored, a disk 25 which stores digital video information processed by the digital video editor as well as other application programs and data such as word processing programs and the like, a keyboard 26, a pointing device 28 such as a computer mouse or an electronic pen which permit operator control of the digital video editor, a buffer memory 27 which holds values for each pixel appearing on attached monitor 27a and which is constantly read out to monitor 27a to permit viewing of video information, computer graphics and text, and video decompression hardware 29 which decompresses compressed digital video information and feeds it to D-to-A converter 30 for conversion into an analog video signal.

The FIG. 3 digital video editor includes a frame grabber/digitizer 31 which captures frames of analog video information, digitizes them, and provides the digital video information onto computer bus 21 together with a frame number extracted from a portion of the video information. The frame grabber/digitizer 31 includes a color separator and A-to-D converter 32 which separates the colors in the analog video signal into RGB components and converts each of the R, G and B components into digital pixel values. The converted digital video signal is stored in a temporary video memory 34. This temporary video memory 34 can have different purposes. It can serve as a buffer between the digitizer and the computer bus. Also, conventional video frame compressors process a frame in square blocks that span more than one line and thus need to access several lines of video data simultaneously. The size of the memory can range between the number of lines corresponding to the height of a compression block to twice the full video frame size which will allow double buffering where one half is read by the compressor or the bus while the other half is filled with the next frame.

A frame number extractor 35 extracts the region of a frame that contains the encoded frame number, typically a few lines of the invisible portion of a frame. The frame region is provided onto the computer bus 21 in synchronization with the digital video information which may be compressed by video compression hardware 36 if desired. CPU 22 decodes the frame region provided by extractor 35 to obtain a frame number in computer readable form.

Figure 4:
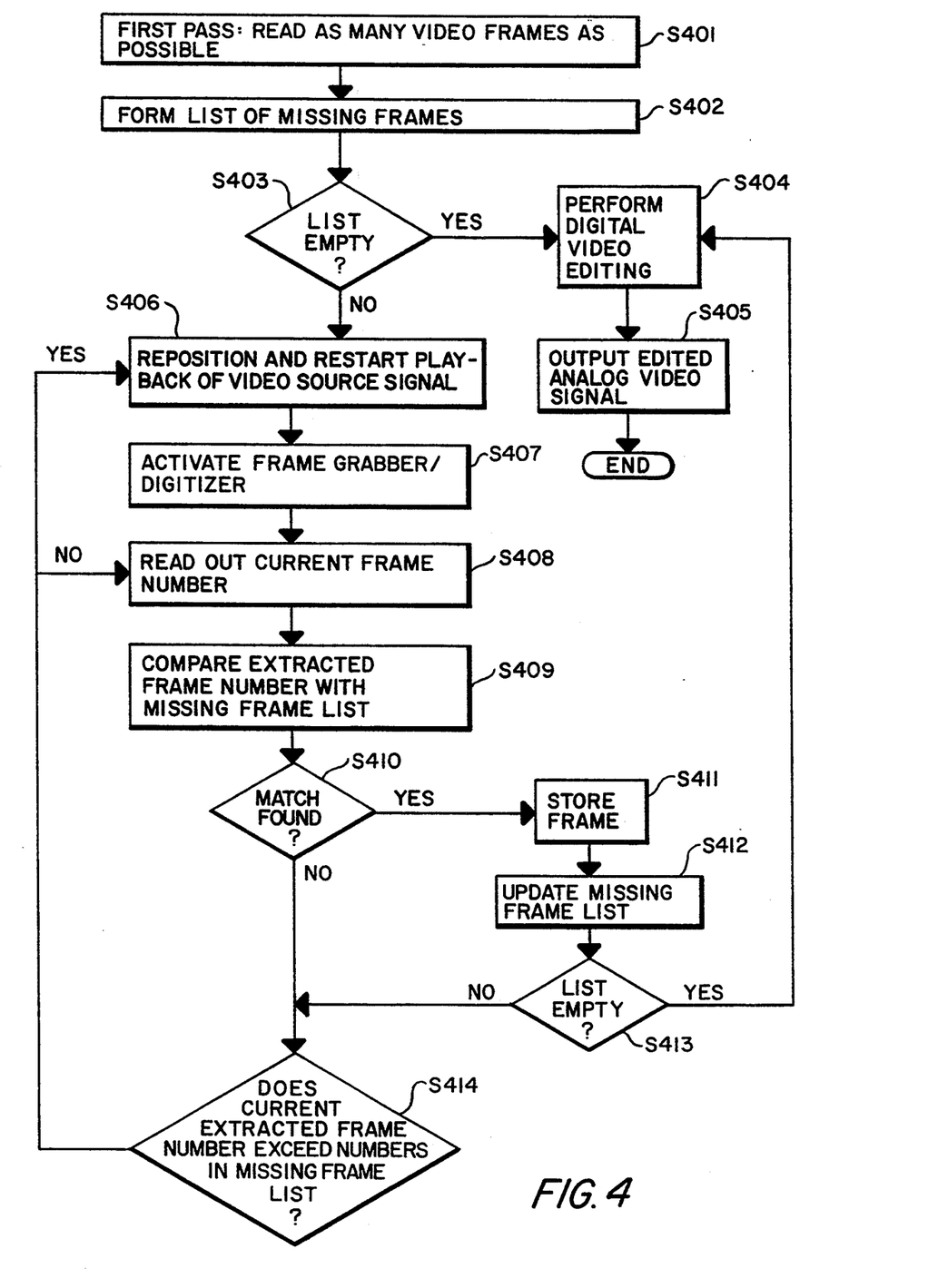
FIG. 4 is a flowchart showing a digital video editing method that can be used with the FIG. 3 embodiment.

FIG. 4 is a flow diagram showing an operational mode of the digital video editor shown in FIG. 3. The process steps depicted in FIG. 4 are executed by CPU 22 in accordance with a stored program which is contained most conveniently on disk 25 and executed out of RAM 24.

In step S401, the analog video source is activated so as to provide analog video frame information to color separator and A-to-D converter 32. The activation of the analog source may be manual or under automatic control of CPU 22. As many frames of analog video information as possible are digitized by frame grabber/digitizer 31 and stored in compressed or uncompressed form, for example, on disk 25 or to network storage via network interface 23a. Preferably, this digitization is performed in real time, that is, at 30 frames per second in the case of NTSC standard video signals.

In coordination with digitization and storage of the frames of video information, frame number extractor 35 derives the frame number region from the non-visible portion of each frame. The frame number region is provided onto computer bus 21 in synchronization with the digital video frame information and is decoded and stored by CPU 22 in correspondence with that information onto disk 25.

Step S402 forms a list of missing frames from the frame numbers extracted by extractor 35 and decoded by CPU 22. More particularly, CPU 22 inspects each frame number decoded from frame regions provided onto computer bus 21 to ensure that the frame numbers represent a complete sequence of video frames. Thus, referring to FIG. 2, CPU 22 determines that the frame number for frame 15 ("1:30:43:00") indicates that frame 15 is the next succeeding frame after frame 16 because the frame number for frame 16 ("1:30:42:29") differs by only a single frame for the frame number from frame 15. Thus, CPU 22 is able to determine that there are no missing frames between frames 15 and 16.

When considering the frame number for frame 17, however, CPU 22 determines that frame 18 has been missed since the frame number for frame 17 ("1:30:43:02") indicates that frame 17 is not the next succeeding frame from frame 15. Thus, CPU 22 determines that there is a missing frame between frames 15 and 17 and inserts the frame number of missing frame 18 (here frame number "1:30:43:01") into the missing frame list.

In step S403, CPU 22 determines whether the missing frame list is empty, indicating that there are no missing frames. If the missing frame list is empty, then processing advances to step S404 where digital video editing is performed in accordance with the digital video editing capabilities provided by CPU 22. When digital video editing is complete, the edited digital signal is output via digital video decompression hardware 29 if necessary and D-to-A converter 30 for permanent storage on analog video equipment.

However, in the event that step S403 determines that the missing frame list is not empty, meaning that there are missing frames, then steps S406 through S414 are performed so as to supply the missing frames of digital information.

First, in step S406, the analog video source is repositioned to a point which precedes the first missing frame, and playback of the analog video source is commenced. Repositioning and playback can be started either manually or by computer control through CPU 22. In this regard, repositioning the analog video source may be facilitated by sorting the missing frame list so that the missing frames are listed in ascending order. While sorting is not absolutely necessary, it is nevertheless preferable since it permits sequential processing of each frame in the list.

In step S407, frame grabber/digitizer 31 is activated, thereby providing video frame data, optionally compressed via compressor 36, onto computer bus 21. In synchronism therewith, frame regions containing frame numbers for the video frame data are provided on the bus via frame number extractor 35.

In step S408, the current frame number is read from frame number extractor 35. The extracted frame number is decoded and then compared with the entries in the missing frame list (step S409), and if a match is found (step S410) flow advances to step S411 where the corresponding video frame information is stored onto disk 25. The missing frame list is updated in step S412 so as to remove the newly-found frame. Step S413 determines if the missing frame list has been emptied; if so, flow returns to step S404 where digital video editing is performed.

On the other hand, if no match is found in step S410, or if the missing frame list is not empty in step S413, then nothing need be done with the current frame information stored in temporary video memory 34. Instead, flow advances to step S414 which determines whether the current frame number exceeds all the missing frame numbers in the missing frame list. If the current frame number exceeds the frame numbers in the missing frame list, then the analog video source has progressed too far and flow returns to step S406 where the analog video source is repositioned. On the other hand, if the current frame number does not exceed the frame numbers in the missing frame list, then there is no need to reposition the analog video source signal and flow returns only to step S408 where the frame number for the next digitized frame is read out and processed as described above.

The above-described embodiment and corresponding processing is effective to ensure that missing frames are detected accurately, and is effective to ensure that when read on a subsequent pass each frame is identified accurately and the proper missing frame is supplied. However, with the FIG. 3 embodiment, it is not always possible to guarantee that progress will be made in supplying missing frames. More particularly, it is possible that the circumstances which caused the frames to be missed in first pass step S401 will also exist in subsequent attempts to read the missing frame. Accordingly, while the FIG. 3 embodiment can accurately detect when a frame is missing, it may be nevertheless difficult to supply the missing frame with certainty.

Figure 5:
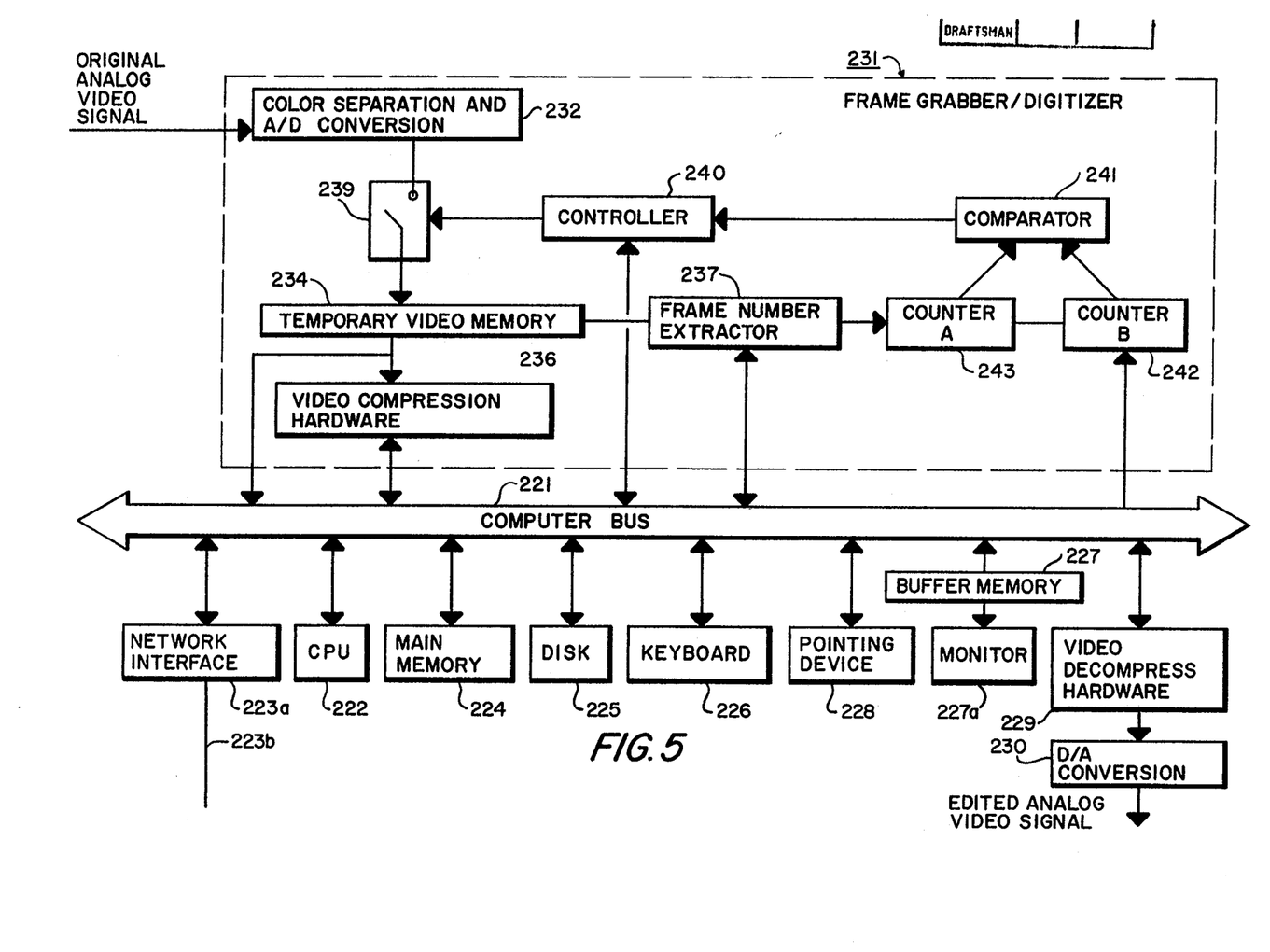
FIG. 5 is a block diagram of a second embodiment of the invention.

FIG. 5 is a block diagram illustrating a second embodiment of the invention which guarantees that missing frames will be supplied. Elements similar to those shown in FIG. 3 have been given similar reference numerals and detailed descriptions thereof are omitted.

In FIG. 5, an original analog video signal is provided to frame color separator and A-to-D converter 232 disposed inside frame grabber/digitizer 231. Color separator and A-to-D converter 232 provides the digitized frame information to temporary video frame memory 234 via switch 239 which together form a freezable video frame memory. Switch 239 is operated under control of controller 240 as described in more detail hereinbelow. From temporary video frame memory 234, the digitized video information is optionally provided to video compression hardware 236 which in turn provides compressed digital video information onto computer bus 221.

Frame number extractor 237 extracts the frame region containing the encoded frame number from the temporary video frame memory 234 each time a new frame has been put there. At the same time extractor 237 increments counter 243. This means counter 243 counts the number of frames going by since it has been reset. Counter 243 is reset to 0 by frame extractor 237 when CPU 222 issues a special read and reset instruction to read the frame number region from frame extractor 237 via computer bus 221 and simultaneously to reset counter 243. The frame number region can also be read by a normal read instruction without resetting the counter 243. CPU 222 decodes the frame region received after a read and reset or a read instruction from extractor 237 to obtain the current frame number. Counter 242 is loaded by the CPU 222 via computer bus 221 to contain the number of frames that have to go by since the last read and reset instruction until a desired frame has been reached.

Comparator 241 compares the two counters 242 and 243 for equality. When coincidence is detected, comparator 241 provides a signal to controller 240, and controller 240 uses that signal to control switch 239 as follows.

Controller 240 operates in one of two computer controllable modes based on instructions from CPU 222. In the first mode, controller 240 causes switch 239 to remain closed thereby permitting all digitized data from A-to-D converter 232 to be stored in temporary video frame memory 234. In the second mode, controller 240 causes switch 239 to remain closed only so long as a signal from comparator 241 is not received. When a signal from comparator 241 is received, indicating coincidence between the two counters 242 and 243, i.e., that a desired frame number has been reached, controller 240 opens the switch 239 thereby freezing memory 244 and preventing additional digitized frame information from being stored on temporary video frame memory 234. Thus, controller 240 operates in a trap mode. In this second mode, controller 240 signals CPU 222 that the frame number has been trapped.

Figure 6:
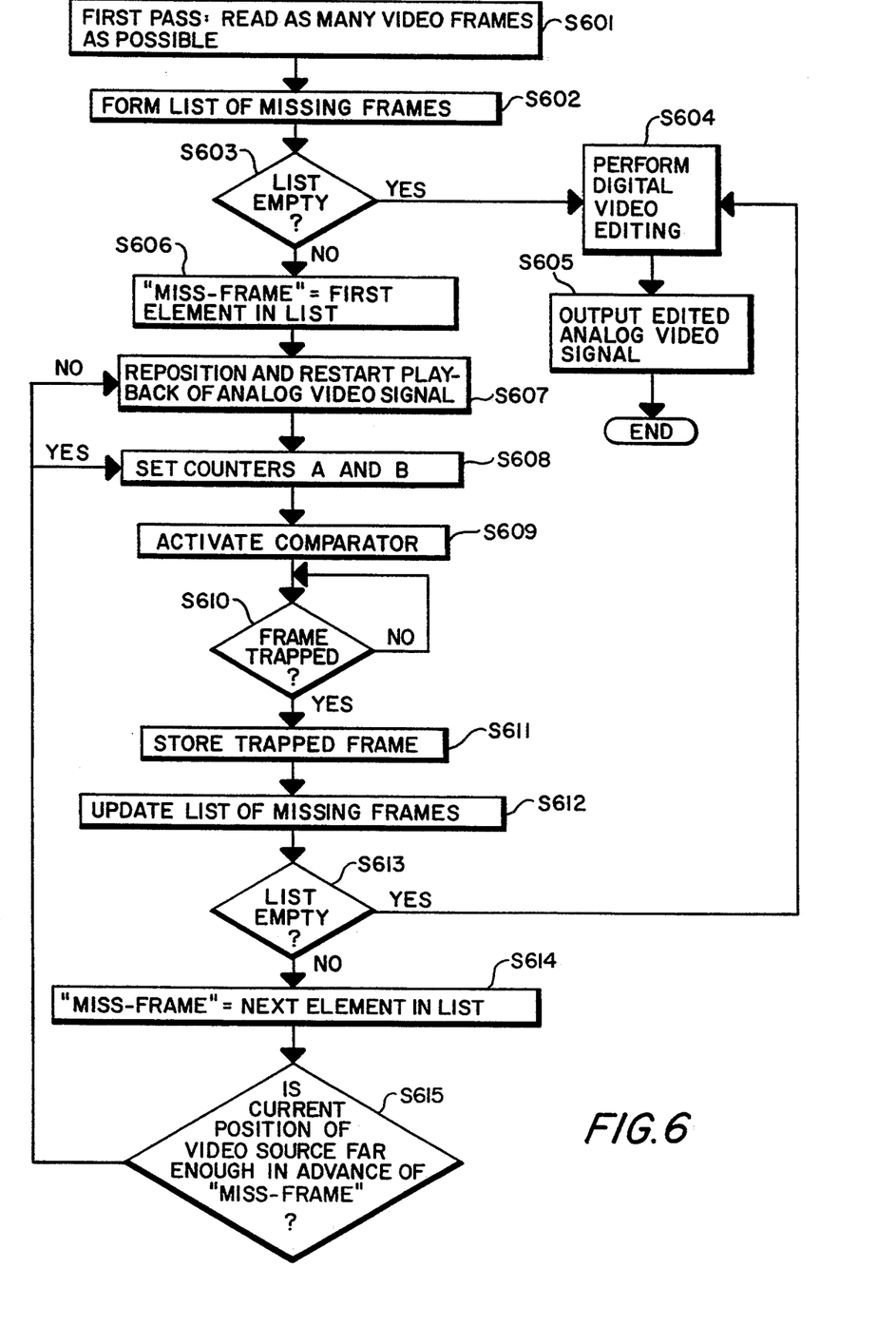
FIG. 6 is a flow diagram showing a digital video editing method that can be used with the FIG. 5 embodiment.

FIG. 6 is a flow diagram illustrating a method of digital video editing using the FIG. 5 apparatus. The process steps depicted in FIG. 6 are executed by CPU 222 in accordance with a program stored on disk 225 and loaded into RAM 224.

In step S601, the analog video source is activated so as to provide analog video frame information to color separator and A-to-D converter 232. The activation of the analog source may be manual or under automatic control of CPU 222. CPU 222 sets controller 240 into the first mode where switch 239 is closed whereby frames of digital video information are stored directly into temporary video frame memory 234. As many frames of analog video information as possible are digitized by frame grabber/digitizer 231 and stored in compressed or uncompressed form on disk 225. Preferably, this digitization is performed in real time, that is, at 30 frames per second in the case of NTSC standard video signals.

In coordination with digitization and storage of the frames of video information, frame number extractor 237 extracts the frame region containing the frame number from the temporary video frame memory 234. The frame number region is provided onto computer bus 221 in synchronization with the digital video frame information and is decoded and stored by CPU 222 in correspondence with that information onto disk 225.

Step S602 forms a list of missing frames from the frame numbers extracted by extractor 237 and decoded by CPU 222. The tabulation of the missing frame list is similar to the technique described in connection with step S402 of FIG. 4.

In step S603, CPU 222 determines whether the missing frame list is empty, indicating that there are no missing frames. If the missing frame list is empty, then processing advances to step S604 where digital video editing is performed in accordance with the digital video editing capabilities provided by CPU 222. When digital video editing is complete, the edited digital signal is output via digital video decompression hardware 229 and D-to-A converter 230 for permanent storage on analog video equipment.

If step S603 determines that the missing frame list is not empty, then flow advances to step S606 in which the variable "MISS_FRAME" is set to the first element in the missing frame list. For purposes of this step, it is preferable for the missing frame list to be sorted in ascending order.

In step S607, the analog video source is repositioned to a position which precedes the frame number stored in the MISS_FRAME variable. Repositioning may be performed manually or under computer control by CPU 222. At the end of step S607, the analog video source signal is replayed.

In step S608, the current frame number region is read by a read and reset instruction from extractor 237 which resets counter 243 to 0. The region is decoded to obtain the current frame number. Then, the difference between the current frame number and the value of the MISS_FRAME variable is stored in counter 242 to indicate the number of frames that have to go by since counter 243 was reset until the desired frame is reached. Comparator 241 is activated (step S609), and CPU 222 sets controller 240 into the second mode (the "trap" mode) which in the absence of coincidence detection by comparator 241 causes switch 239 to close. This permits digitized frame information to be stored in temporary video frame memory 234.

In step S610, CPU 222 determines whether the desired frame number has been trapped by reference to the trap signal provided from controller 240. Program flow does not advance until the desired frame number has been trapped.

When comparator 241 determines that there is coincidence between the two counters 242 and 243 indicating that the desired video frame has been reached, it signals controller 240 which in turn opens switch 239 to freeze the contents of video frame memory 234. This prevents additional digitized frame information from being stored into video frame memory and erasing the desired frame information. Controller 240 then provides a trap signal to CPU 222.

When in step S610 CPU 22 receives the trap signal and determines that a frame has been trapped, flow advances to step S611 in which the trapped frame stored in video frame memory 234, compressed or uncompressed, is stored onto disk 225. The missing frame list is updated to remove the newly trapped frame (step S612), and in step S613 the list is inspected to determine if it is empty. If the list is empty, then flow returns to step S604 where digital video editing is performed. If, on the other hand, the missing frame list is not yet empty, then flow advances to step S614 in which the MISS_FRAME variable is set to the next element in the missing frame list. Step S615 determines if the current position of the video source is far enough in advance of the MISS_FRAME variable. If the current position of the video source is far enough in advance of the MISS_FRAME element, then there is no need to reposition the video source, and flow returns to step S608 in which the current frame number region is read by a read and reset instruction from extractor 237, the number is decoded, the difference to MISS_FRAME is stored in counter 242, and the trap is reset. On the other hand, if the current position of the video source is not far enough in advance of the frame number stored in the MISS_FRAME variable, then flow returns to step S607 which repositions the analog video source so as to provide suitable frame information.

With the embodiment shown in FIG. 5 and the processing techniques shown in FIG. 6, it is possible to guarantee that missing frames are not only detected with accuracy but it is also possible to guarantee that needed missing frames will be supplied.

What is claimed is:

1. Apparatus for storing frames of digital video information from corresponding frames of analog video information, said apparatus comprising:

a digital frame memory for storing frame of digital video information;

an analog-to-digital convertor which converts successive frames of analog video information into corresponding successive frames of digital video information and which stores individual frames of digital video information in said digital frame memory;

a frame number extractor which extracts a frame number from non-visible portions of the frame of digital video information stored in said digital frame memory;

means for comparing the extracted frame number with a prior extracted frame number to determine whether a frame of digital video information is missing;

control means for causing said digital frame memory to store missing frames of digital video information; and storage means for successively storing frames or digital video information from said digital frame memory.

2. Apparatus according to claim 1 further comprising a comparator for comparing a frame number extracted by said extractor and a missing frame number, and wherein said control means freezes current contents of the digital frame memory when said comparator detects coincidence so as to trap the missing frame.

3. Apparatus according to claim 2, wherein said control means is comprised by a processor operable in at least two modes, wherein in the first mode said processor tabulates a list of frame numbers corresponding to missing frames of digital video information and wherein in the second mode said processor sequentially designates frame numbers from the tabulated list for trapping.

4. Apparatus for digitizing frames of analog video information into frames of digital video information, said apparatus comprising:

input means for inputting frames of analog video information, the analog video information including both visible and non-visible portions;

converting means for converting the frames of analog video information into corresponding frames of digital video information;

a frame memory for storing visible and non-visible portions of a frame of digital video information converted by said converting means;

extracting means for extracting a frame number from the non-visible portion of video information;

means for determining, from the extracted frame number information, whether a frame of digital video information is missing; and control means for causing said digital frame memory to store a missing frame of digital frame information.

5. Apparatus according to claim 4, wherein said extracting means is adapted to extract the frame number from the non-visible portion of the digital video information stored in said frame memory.

6. Apparatus according to claim 4, further comprising means for decoding the extracted frame number into computer readable form.

7. Apparatus according to claim 4, further comprising compression means for compressing the frames of digital video information.

8. Apparatus according to claim 7, wherein said converting means converts both visible and non-visible portions of the frames of analog video information, and wherein said compression means is adapted to compress only the visible portion.

9. Apparatus according to claim 4, wherein said digital frame memory is comprised by a freezable frame memory for storing a frame of digital video information.

10. Apparatus according to claim 9, wherein said control means controls said freezable frame memory to freeze memory contents when the frame number of the video information stored in said freezable frame memory is the same as a pre-designated frame number.

11. Apparatus according to claim 10, wherein said control means freezes said freezable frame memory in the event that there is coincidence between the extracted frame number and the pre-designated frame number information, whereby the current frame of digital video information stored in said frame memory is frozen.

12. Apparatus according to claim 10, wherein said control means comprises a first counter whose contents are automatically adjusted when a new frame of video information is stored in said freezable frame memory, a second counter for storing a count representative of the pre-designated frame number, and a comparator for comparing contents of the first and second counters.

13. Apparatus for storing frames of digital video information, said apparatus comprising:
input means for inputting frames of analog video information;
converting means for converting the frames of analog video information into corresponding frames of digital video information;
extracting means for extracting a frame number from video information;
means for storing frames of digital video information converted by said converting means; and
a processor operable to execute stored program instructions such that said processor controls storage of frames of digital video information in at least two modes, wherein in the first mode said processor causes storage of frames of digital video information and tabulates a list of frame numbers corresponding to missing frames of digital video information, and wherein in the second mode said processor causes storage of frames of digital video information corresponding to the frame numbers in the list.

14. Apparatus according to claim 13, wherein said processor tabulates the list of missing frames based on a comparison of successive frame numbers extracted by said extracting means.

15. Apparatus according to claim 13, wherein said extracting means extracts the frame number from the converted frames of digital video information.

16. Apparatus according to claim 13, wherein said converting means converts both visible and non-visible portions of the frames of analog video information.

17. Apparatus according to claim 16, wherein said extracting means is adapted to extract the frame number from the non-visible portion.

18. Apparatus according to claim 16, further comprising a frame memory for storing visible and non-visible digital video information converted by said converting means.

19. Apparatus according to claim 18, wherein said extracting means is adapted to extract the frame number from the non-visible portion of the digital video information stored in said frame memory.

20. Apparatus according to claim 13, further comprising means for decoding the extracted frame number into computer readable form.

21. Apparatus according to claim 13, further comprising compression means for compressing the frames of digital video information.

22. Apparatus according to claim 21, wherein said converting means converts both visible and non-visible portions of the frames of analog video information, and wherein said compression means is adapted to compress only the visible portion.

23. Apparatus according to claim 13, further comprising a freezable frame memory for storing a frame of digital video information.

24. Apparatus according to claim 23, further comprising a controller which operates based on instructions from said processor for controlling said freezable frame memory to freeze memory contents when the frame number of the video information stored in said freezable frame memory is the same as a pre-designated frame number.

25. Apparatus according to claim 23, wherein said controller comprises a first counter whose contents are automatically adjusted when a new frame of video information is stored in said freezable frame memory, a second counter for storing a count representative of the pre-designated frame number, and a comparator for comparing contents of the first and second counters.

26. Apparatus according to claim 25, wherein said processor calculates the difference between the frame number of the video information stored in said freezable memory and the predesignated frame number and stores the difference to said second counter.

27. Apparatus according to claim 26, wherein said first counter is adapted to be reset to zero in correspondence with the extraction of a new frame number.

28. Apparatus according to claim 24, wherein in the second mode said controller freezes said freezable frame memory in the event that there is coincidence between the extracted frame number and the pre-designated frame number, whereby the current frame of digital video information stored in said frame memory is frozen.

29. Apparatus according to claim 24, wherein in the first mode said controller controls said freezable memory so as to allow newly-converted frames of digital video information to be stored.

30. A digital video editor, comprising:
input means for inputting frames of analog video information;
converting means for converting the frames of analog video information into corresponding frames of digital video information;

extracting means for extracting a frame number from video information;

means for storing frames of digital video information converted by said converting means;

a processor operable to execute stored program instructions such that said processor controls storage of frames of digital video information in at least two modes, wherein in the first mode said processor causes storage of frames of digital video information and tabulates a list of frame numbers corresponding to missing frames of digital video information, and wherein in the second mode said processor causes storage of frames of digital video information corresponding to the frame numbers in the list;

said processor also for modifying frames of digital video information stored in said storage means and for storing the modified frames of digital video information; and output means for outputting frames of analog video information which correspond to the modified frames of digital video information.

31. Apparatus according to claim 30, wherein said processor tabulates the list of missing frames based on a comparison of successive frame numbers extracted by said extracting means.

32. Apparatus according to claim 30, wherein said extracting means extracts the frame number from the converted frames of digital video information.

33. Apparatus according to claim 30, wherein said converting means converts both visible and non-visible portions of the frames of analog video information.

34. Apparatus according to claim 33, wherein said extracting means is adapted to extract the frame number from the non-visible portion.

35. Apparatus according to claim 33, further comprising a frame memory for storing visible and non-visible digital video information converted by said converting means.

36. Apparatus according to claim 35, wherein said extracting means is adapted to extract the frame number from the non-visible portion of the digital video information stored in said frame memory.

37. Apparatus according to claim 30, further comprising means for decoding the extracted frame number into computer readable form.

38. Apparatus according to claim 30, further comprising compression means for compressing the frames of digital video information.

39. Apparatus according to claim 38, wherein said converting means converts both visible and non-visible portions of the frames of analog video information, and wherein said compression means is adapted to compress only the visible portion.

40. Apparatus according to claim 30, further comprising a freezable frame memory for storing a frame of digital video information.

41. Apparatus according to claim 40, further comprising a controller which operates based on instructions from said processor for controlling said freezable frame memory to freeze memory contents when the frame number of the video information stored in said freezable frame memory is the same as a pre-designated frame number.

42. Apparatus according to claim 41, wherein said controller comprises a first counter whose contents are automatically adjusted when a new frame of video information is stored in said freezable frame memory, a second counter for storing a count representative of the pre-designated frame number, and a comparator for comparing contents of the first and second counters.

43. Apparatus according to claim 42, wherein said processor calculates the difference between the frame number of the video information stored in said freezable memory and the predesignated frame number and stores the difference to said second counter.

44. Apparatus according to claim 43, wherein said first counter is adapted to be reset zero in correspondence with the extraction of a new frame number.

45. Apparatus according to claim 41, wherein in the second mode said controller freezes said freezable frame memory in the event that there is coincidence between the extracted frame number and the pre-designated frame number, whereby the current frame of digital video information stored in said frame memory is frozen.

46. Apparatus according to claim 41, wherein in the first mode said controller controls said freezable memory so as to allow newly-converted frames of digital video information to be stored.

47. Apparatus according to claim 30, wherein frame modifications performable by said processor include slow motion, color modification, text insertion and image processing.

48. Apparatus according to claim 30, wherein said output means includes a D/A converter.

49. Apparatus according to claim 48, wherein said storing means stores the frames of digital video information in compressed digital form, and wherein said output means includes a decompressor.

* * * * *

UNITED STATES PATENT AND TRADEMARK OFFICE
CERTIFICATE OF CORRECTION

PATENT NO. : 5,367,341
DATED : November 22, 1994
INVENTOR(S) : Peter Schnorf

It is certified that error appears in the above-indentified patent and that said Letters Patent is hereby corrected as shown below:

Column 2, line 5, change "put" to --puts--.

Column 4, line 12, change "drive" to --drive,--; and
line 39, change "an" to --a--.

Column 9, line 43, change "CPU 22" to --CPU 222--.

Column 10, line 12, change "storing" to --storing at least one--;
line 31, change "or" to --of--; and
line 67, change the second occurrence of "frame" to --video--.

Column 14, line 27, change "reset" to --reset to--.

Signed and Sealed this

Fourth Day of April, 1995

Attest:

BRUCE LEHMAN

*Attesting Officer*   *Commissioner of Patents and Trademarks*